US008905761B2

(12) United States Patent
Ichikawa

(10) Patent No.: US 8,905,761 B2
(45) Date of Patent: Dec. 9, 2014

(54) TRAINING SYSTEM, TRAINING DEVICE, AND PROGRAM RECORDING MEDIUM AND PLAYBACK CONTROL METHOD

(75) Inventor: Masanori Ichikawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1365 days.

(21) Appl. No.: 12/134,305

(22) Filed: Jun. 6, 2008

(65) Prior Publication Data

US 2008/0305463 A1     Dec. 11, 2008

(30) Foreign Application Priority Data

Jun. 8, 2007   (JP) .................................. 2007-152552

(51) Int. Cl.
*G09B 7/00*     (2006.01)
*G09B 19/00*    (2006.01)
(52) U.S. Cl.
CPC . *G09B 7/00* (2013.01); *G09B 19/00* (2013.01)
USPC ............................................. 434/247; 482/4
(58) Field of Classification Search
USPC ..................................... 434/247; 482/92, 131
See application file for complete search history.

(56) References Cited

U.S. PATENT DOCUMENTS

| 4,497,312 | A  | * | 2/1985  | Byrd .................................. | 600/27 |
| 8,025,606 | B2 | * | 9/2011  | Hamilton ............................ | 482/4 |
| 8,235,870 | B2 | * | 8/2012  | Hamilton ............................ | 482/4 |
| 2005/0112536 | A1 | * | 5/2005  | Frayman ........................... | 434/247 |
| 2005/0181347 | A1 | * | 8/2005  | Barnes et al. .................... | 434/350 |
| 2006/0282003 | A1 | * | 12/2006 | Bingham et al. ............... | 600/538 |
| 2007/0067420 | A1 |   | 3/2007  | Yamaguchi |  |
| 2007/0106949 | A1 |   | 5/2007  | Narita et al. |  |
| 2007/0191096 | A1 |   | 8/2007  | Tanaka |  |
| 2007/0281791 | A1 |   | 12/2007 | Ichikawa et al. |  |
| 2008/0045285 | A1 |   | 2/2008  | Fujito |  |

FOREIGN PATENT DOCUMENTS

JP        2005296358 A   * 10/2005

* cited by examiner

*Primary Examiner* — Kesha Frisby
(74) *Attorney, Agent, or Firm* — Greenblum & Bernstein, P.L.C.

(57) ABSTRACT

Disclosed is a training system that enables a player to take a lesson with smooth and correct breathing and continuously take a lesson while overcoming frustration. An instructor image related to a yoga pose and a breathing timing are displayed on a display. A training device is a portable type, such that the player can hold the training device in one hand, and take a lesson while watching the display. In addition, the player can take the lesson with correct breathing by watching the displayed breathing timing. When it is difficult to take the same pose as the instructor image related to the yoga pose, the player selects 'SIMPLE POSE'. Then, a simple pose is displayed on the basis of simple pose data. The simple pose has lower difficulty level than an elementary pose, and thus even a player who is lacking in limberness can take the corresponding pose.

19 Claims, 11 Drawing Sheets

FIG. 2

COUNSELING DATA TABLE

| | QUESTION STATEMENT |
|---|---|
| QUESTION 1 | 1-1 |
| | 1-2 |
| | 1-3 |
| | ... |
| QUESTION 2 | 2-1 |
| | 2-2 |
| | 2-3 |
| | ... |
| | |
| CONCLUSION | 1 |
| | 2 |
| | 3 |
| | ... |

| CURRICULUM DATA TABLE | | | | | |
|---|---|---|---|---|---|
| LESSON NO. \ COURSE | STRESS RELEASE COURSE | ○○○○ COURSE | ×××× COURSE | △△△△ COURSE | |
| LESSON 1 | POSE 1 | POSE 2 | POSE 3 | POSE 15 | |
| LESSON 2 | POSE 3 | POSE 5 | POSE 10 | POSE 11 | |
| LESSON 3 | POSE 6 | POSE 8 | POSE 11 | POSE 9 | |
| ------ | ------ | ------ | ------ | ------ | |

POSE (1 TO N) DATA TABLE 74

| | ELEMENTARY POSE | SIMPLE POSE 1 | SIMPLE POSE 2 | ----- |
|---|---|---|---|---|
| IMAGE DATA | ELEMENTARY PHOTOGRAPHIC IMAGE | SIMPLE 1 PHOTOGRAPHIC IMAGE | SIMPLE 2 PHOTOGRAPHIC IMAGE | ----- |
| SOUND DATA | ELEMENTARY SOUND | SIMPLE 1 SOUND | SIMPLE 2 SOUND | ----- |
| BREATHING TIMING DATA | ELEMENTARY BREATHING TIMING | SIMPLE 1 BREATHING TIMING | SIMPLE 2 BREATHING TIMING | ----- |
| DIFFICULTY LEVEL DATA | 100 | 20 | 15 | ----- |

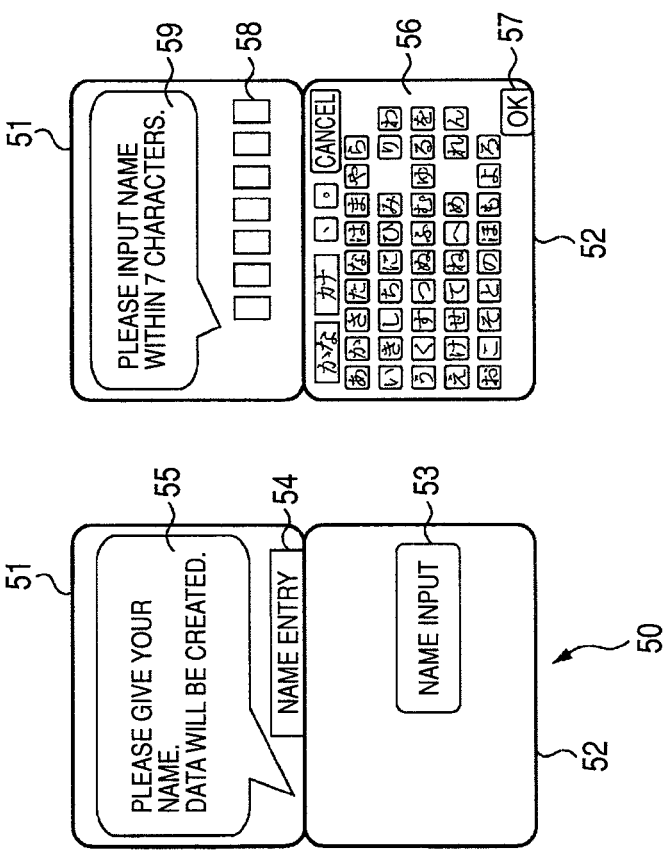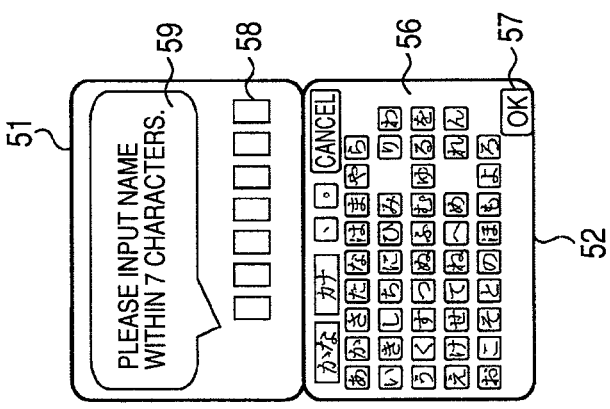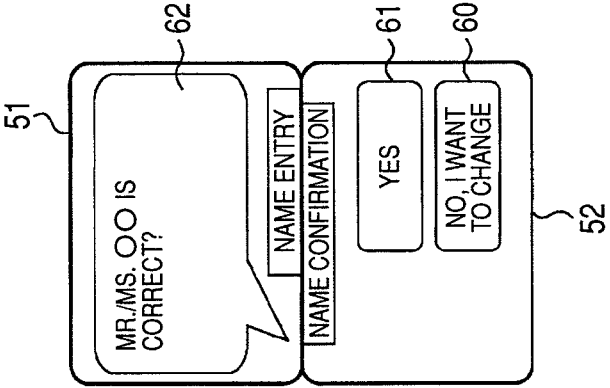

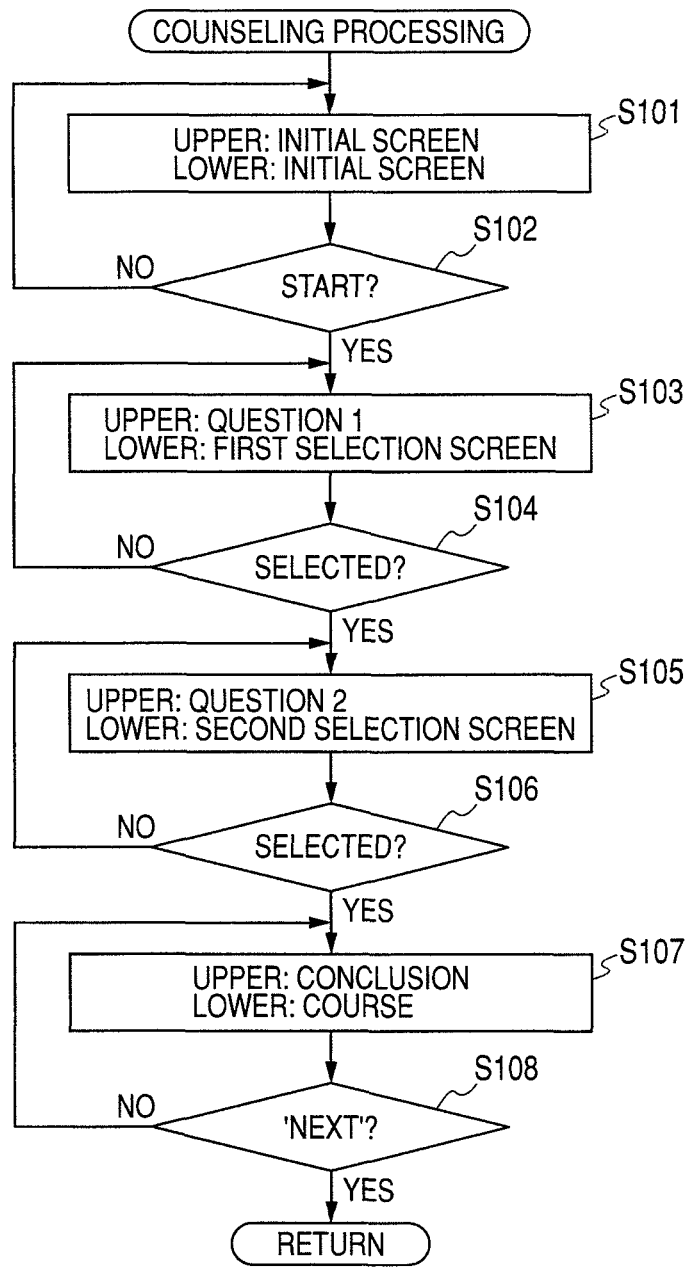

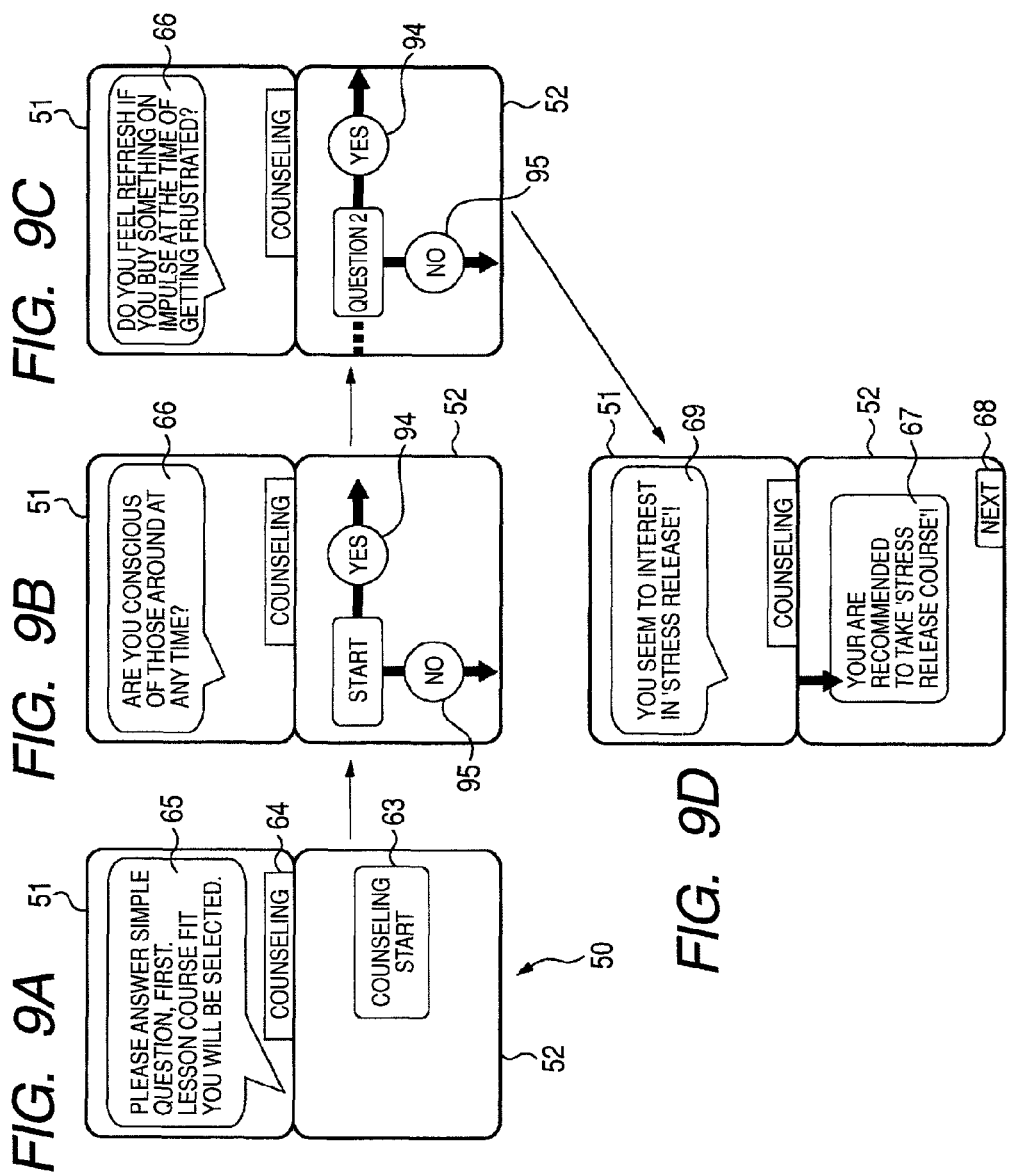

data storage unit that stores simple pose data which, for each elementary pose, is used to display simple poses having lower difficulty level than the elementary pose, and a breathing timing data storage unit that stores timing data which is notified by the notification unit for each of the elementary poses and the simple poses. The recording medium has recorded thereon a program which causes the computer to execute the steps of: causing the display unit to display an elementary pose on the basis of the elementary pose data, and causing the notification unit to notify a breathing timing corresponding to the elementary pose on the basis of the breathing timing data; in a state in which the elementary pose is displayed on the display unit in the step of causing the display unit to display the elementary pose, detecting presence/absence of a predetermined operation; when the predetermined operation is detected in the step of detecting the predetermined operation, reading out, from the simple pose data storage unit, simple pose data corresponding to a simple pose, which corresponds to the elementary pose displayed on the display unit, and reading out, from the breathing timing data storage unit, breathing timing data corresponding to the read simple pose data; and causing the display unit to display the simple pose on the basis of the simple pose data read in the step of reading out the simple pose data, and causing the notification unit to notify a breathing timing corresponding to the simple pose on the basis of the breathing timing data.
TRAINING SYSTEM, TRAINING DEVICE, AND PROGRAM RECORDING MEDIUM AND PLAYBACK CONTROL METHOD

CROSS REFERENCE TO RELATED APPLICATION

The present disclosure relates to subject matter contained in Japanese Patent Application No. 2007-152552, filed on Jun. 8, 2007, the disclosure of which is expressly incorporated herein by reference in its entirety.

BACKGROUND OF THE INVENTION

1. Field of the Invention

The present invention relates to a training system, a training device, a program recording medium, and a training program, which are used for lessons on yoga or stretching exercise.

2. Description of the Related Art

Many DVDs having recorded thereon images and sound for lessons on yoga have been placed on the market. People can practice yoga by themselves at home by getting such DVD and watching the DVD through a television receiver, without taking a lesson from an instructor at a predetermined place, such as a yoga school or the like.

Yoga is an exercise system that uses a variety of twisted or bent poses with the body. Then, when a lesson is given while video is displayed on a television screen, a user must turn his/her face in a different direction from the television screen according to the kind of pose. Accordingly, to confirm the pose the television screen, it is necessary for the user to change the pose during training and to watch the screen. For this reason, the lesson cannot be smoothly given.

In addition, yoga is closely connected with the breathing rhythm, and accordingly if it is not practiced with correct breathing technique, it does not provide mental and physical relief so much. It is difficult for the user to recognize the breathing timing of the instructor on the television screen, and to take the lesson with correct breathing.

Furthermore, since many yoga poses are complex, it may be difficult for a beginner to quickly follow the motion of the instructor or to take a specific pose. For this reason, many users may get frustrated even if they start lessons on yoga for the purpose of training their minds and bodies.

These problems are common to other exercises, such as stretching or the like, which uses a series of poses, as well as yoga.

SUMMARY OF THE INVENTION

The invention has been finalized in consideration of the drawbacks inherent in the related art, and it is an object of the invention to provide a training system, a training device, a program recording medium, and a training program, which are capable of enabling a user to take a lesson with smooth and correct breathing technique and to continuously take the lesson while overcoming frustration.

According to a first aspect of the invention, there is provided a training system that trains an exercise using poses with the body. The training system includes a reproducing device and a recording medium installed on the reproducing device. The reproducing device is a portable type, and includes a display unit, a notification unit, and a computer for controlling the units. The recording medium is readable by the computer included in the reproducing device, and includes an elementary pose data storage unit that stores elementary pose data which is used to display a plurality of elementary poses on the display unit, a simple pose data storage unit that stores simple pose data which, for each elementary pose, is used to display simple poses having lower difficulty level than the elementary pose, and a breathing timing data storage unit that stores timing data which is notified by the notification unit for each of the elementary poses and the simple poses. The recording medium has recorded thereon a program which causes the computer to execute the steps of: causing the display unit to display an elementary pose on the basis of the elementary pose data, and causing the notification unit to notify a breathing timing corresponding to the elementary pose on the basis of the breathing timing data; in a state in which the elementary pose is displayed on the display unit in the step of causing the display unit to display the elementary pose, detecting presence/absence of a predetermined operation; when the predetermined operation is detected in the step of detecting the predetermined operation, reading out, from the simple pose data storage unit, simple pose data corresponding to a simple pose, which corresponds to the elementary pose displayed on the display unit, and reading out, from the breathing timing data storage unit, breathing timing data corresponding to the read simple pose data; and causing the display unit to display the simple pose on the basis of the simple pose data read in the step of reading out the simple pose data, and causing the notification unit to notify a breathing timing corresponding to the simple pose on the basis of the breathing timing data.

Accordingly, the user can hold the reproducing device in his/her hand, and take a lesson while watching the display unit. Therefore, the user can take a lesson smoothly without changing his/her pose during training and confirming the display unit. Furthermore, since the breathing timing is notified, the user can recognize the breathing timing during training. In addition, in a state in which the elementary pose is displayed, the simple poses having lower difficulty level than the elementary pose are displayed according to the predetermined operation. Therefore, there is no case in which a trainee gets frustrated during training.

According to a second aspect of the invention, in the training system according to the first aspect of the invention, the display unit may function as the notification unit, and the step of causing the notification unit to notify the breathing timing corresponding to the elementary pose and the step of causing the notification unit to notify the breathing timing corresponding to the simple pose may cause the display unit to display the breathing timing on the basis of the breathing timing data.

Therefore, the lesson pose and the breathing timing can be displayed on the display unit simultaneously.

According to a third aspect of the invention, in the training system according to the first or second aspect of the invention, the reproducing device may further include a playback unit that is controlled by the computer to play back sound, the recording medium may further include a sound data storage unit that stores sound data related to the elementary pose displayed on the basis of the elementary pose data stored in the elementary pose data storage unit, and sound data related to the simple pose displayed on the basis of the simple pose data stored in the simple pose data storage unit, and the step of causing the notification unit to notify the breathing timing corresponding to the elementary pose and the step of causing the notification unit to notify the breathing timing corresponding to the simple pose may cause the playback unit to play back corresponding sound.

Therefore, the user can be directed by sound.

According to a fourth aspect of the invention, in the training system according to any one of the first to third aspects of the invention, the elementary pose data and the simple pose data may be data generated by photography.

According to a fifth aspect of the invention, in the training system according to any one of the first to third aspects of the invention, the recording medium may have recorded thereon a program which causes the computer to further execute a step of selecting one of a plurality of lesson courses according to an operation, and the step of causing the display unit to display the elementary pose may read out elementary pose data from the elementary pose data storage unit according to a lesson course selected in the step of selecting the lesson course, and cause the display unit to display the elementary pose.

According to a sixth aspect of the invention, in the training system according to the fifth aspect of the invention, in the step of selecting the lesson course, the lesson course may be selected according to a multi-stage selection operation.

According to a seventh aspect of the invention, in the training system according to any one of the first to third aspects of the invention, the recording medium may further include a writable storage area, and may have recorded thereon a program which causes the computer to execute a step of writing a training history in at least one of the step of causing the display unit to display the elementary pose and the step of causing the display unit to display the simple pose into the storage area.

According to an eighth aspect of the invention, there is provided a portable training device that trains an exercise using poses with the body. The portable training device includes: a display unit; a notification unit; an elementary pose data storage unit that stores elementary pose data which is used to display a plurality of elementary poses on the display unit; a simple pose data storage unit that stores simple pose data which, for each elementary pose, is used to display simple poses having lower difficulty level than the elementary pose; a breathing timing data storage unit that stores timing data which is notified by the notification unit for each of the elementary poses and the simple poses; a first training processing unit that causes the display unit to display an elementary pose on the basis of the elementary pose data, and causes the notification unit to notify a breathing timing corresponding to the elementary pose on the basis of the breathing timing data; a detection unit that, in a state in which the elementary pose is displayed on the display unit by the first training processing unit, detects presence/absence of a predetermined operation; a readout processing unit that, when the predetermined operation is detected by the detection unit, reads out, from the simple pose data storage unit, simple pose data corresponding to a simple pose, which corresponds to the elementary pose displayed on the display unit, and reads out, from the breathing timing data storage unit, breathing timing data corresponding to the read simple pose data; and a second training processing unit causes the display unit to display the simple pose on the basis of the simple pose data read in the step of reading out the simple pose data, and causes the notification unit to notify a breathing timing corresponding to the simple pose on the basis of the breathing timing data.

According to a ninth aspect of the invention, there is provided a program recording medium that is readable by a computer included in a portable training device, which includes a display unit and a notification unit, and trains an exercise using poses with the body. The program recording medium includes: an elementary pose data storage unit that stores elementary pose data which is used to display a plurality of elementary poses on the display unit; a simple pose data storage unit that stores simple pose data which, for each elementary pose, is used to display simple poses having lower difficulty level than the elementary pose; and a breathing timing data storage unit that stores timing data which is notified by the notification unit for each of the elementary poses and the simple poses. The program recording medium has recorded thereon a program which causes the computer to execute the steps of: causing the display unit to display an elementary pose on the basis of the elementary pose data, and causing the notification unit to notify a breathing timing corresponding to the elementary pose on the basis of the breathing timing data; in a state in which the elementary pose is displayed on the display unit in the step of causing the display unit to display the elementary pose, detecting presence/absence of a predetermined operation; when the predetermined operation is detected in the step of detecting the predetermined operation, reading out, from the simple pose data storage unit, simple pose data corresponding to a simple pose, which corresponds to the elementary pose displayed on the display unit, and reading out, from the breathing timing data storage unit, breathing timing data corresponding to the read simple pose data; and causing the display unit to display the simple pose on the basis of the simple pose data read in the step of reading out the simple pose data, and causing the notification unit to notify a breathing timing corresponding to the simple pose on the basis of the breathing timing data.

According to a tenth aspect of the invention, there is provided a training program. A portable training device includes a display unit, a notification unit, an elementary pose data storage unit that stores elementary pose data which is used to display a plurality of elementary poses on the display unit, a simple pose data storage unit that stores simple pose data which, for each elementary pose, is used to display simple poses having lower difficulty level than the elementary pose, and a breathing timing data storage unit that stores timing data which is notified by the notification unit for each of the elementary poses and the simple poses. The training program causes a computer included in the portable training device to execute the steps of: causing the display unit to display an elementary pose on the basis of the elementary pose data, and causing the notification unit to notify a breathing timing corresponding to the elementary pose on the basis of the breathing timing data; in a state in which the elementary pose is displayed on the display unit in the step of causing the display unit to display the elementary pose, detecting presence/absence of a predetermined operation; when the predetermined operation is detected in the step of detecting the predetermined operation, reading out, from the simple pose data storage unit, simple pose data corresponding to a simple pose, which corresponds to the elementary pose displayed on the display unit, and reading out, from the breathing timing data storage unit, breathing timing data corresponding to the read simple pose data; and causing the display unit to display the simple pose on the basis of the simple pose data read in the step of reading out the simple pose data, and causing the notification unit to notify a breathing timing corresponding to the simple pose on the basis of the breathing timing data.

According to the aspects of the invention, the user can take a lesson while continuously watching the display unit by simply moving the training device by his/her hand. Therefore, the user can take the lesson smoothly without changing the pose during training and confirming the display unit.

Furthermore, since the breathing timing is notified to the user in the form of easy-to-understand, such as an image or sound, the user can recognize the breathing timing during training. Therefore, the user can take a lesson with correct breathing.

Furthermore, in a state in which the elementary pose is displayed, the simple pose having lower difficulty level than the elementary pose is displayed according to the predetermined operation. Therefore, a primary trainee who is difficult to take the elementary pose can continuously take a lesson without getting frustrated during the lesson.

BRIEF DESCRIPTION OF THE DRAWINGS

FIG. 2 is a schematic view showing a counseling data table;
FIG. 3 is a schematic view showing a curriculum data table;
FIG. 5 is a schematic view showing a pose data table;
FIG. 7 is a display transition diagram in a name entry;
FIG. 8 is a flowchart showing the details of a counseling processing;
FIG. 9 is a display transition diagram during a counseling processing.

DETAILED DESCRIPTION OF THE INVENTION

Figure 1:
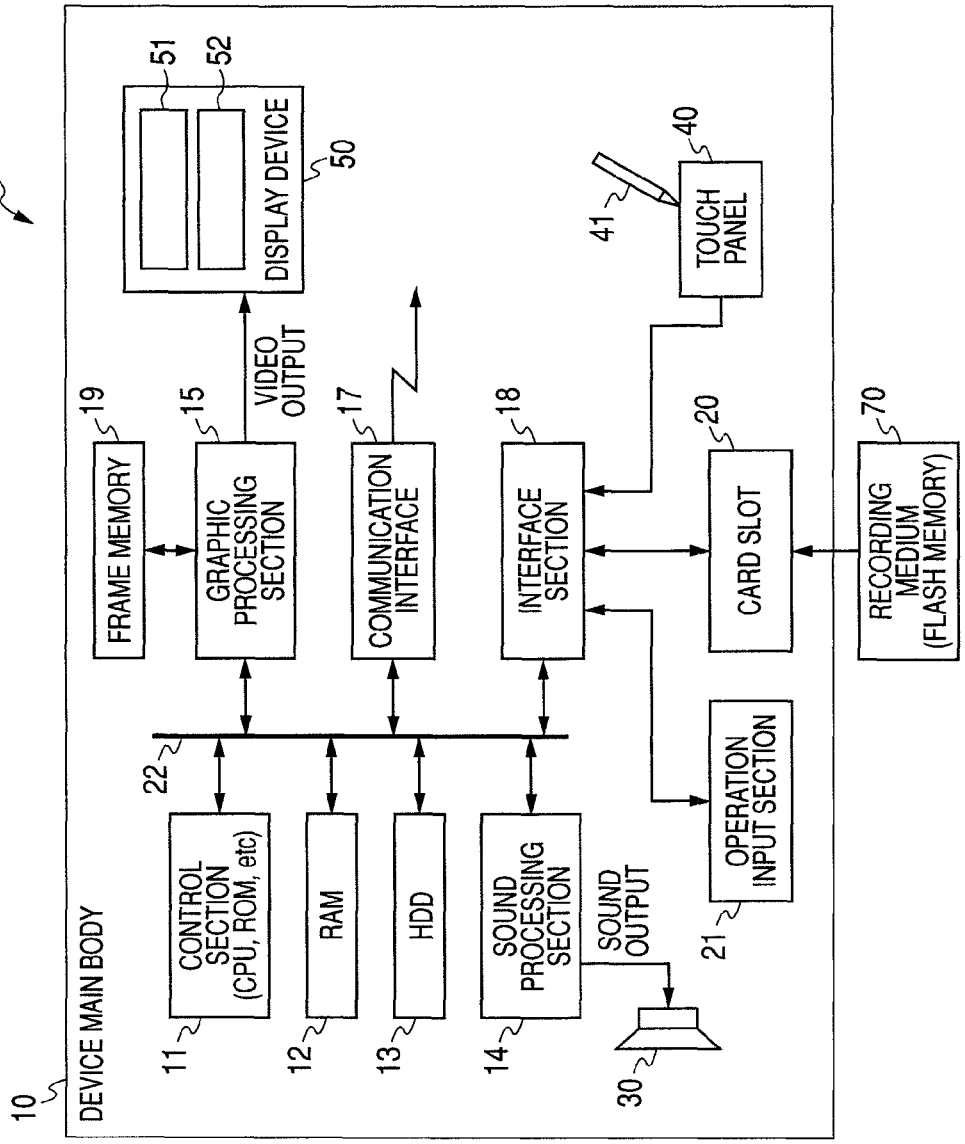
FIG. 1 is a block diagram showing the configuration of a training device according to an embodiment of the invention.

An embodiment of the invention will now be described with reference to the drawings. FIG. 1 is a block diagram showing the configuration of a training device 100 according to an embodiment of the invention. The training device 100 includes a portable device main body 10, and individual units are mounted on the device main body 10.

On the surface of the device main body 10, a display device 50 and an operation input section 21 are provided. The display device 50 has a plurality of image display sections, for example, an upper image display section 51 and a lower image display section 52. The operation input section 21 is constituted form a power supply switch, and switches and keys, such as a cross key or other keys.

A circuit provided in the device main body 10 includes a control section 11, a RAM (Random Access Memory) 12, a hard disc drive (HDD) 13, a sound processing section 14, a graphic processing section 15, a communication interface 17, an interface section 18, a frame memory 19, and a card slot 20. The control section 11, the RAM 12, the HDD 13, the sound processing section 14, the graphic processing section 15, the communication interface 17, and the interface section 18 are connected to an internal bus 22.

The control section 11 includes a CPU (Central Processing Unit), a ROM (Read Only Memory), and the like, and controls the entire training device 100 according to control programs stored in the HDD 13 or a recording medium 70. The control section 11 includes an internal timer that is used to generate timer interruption. The RAM 12 is also used as a work area for the control section 11.

The sound processing section 14 serves as a sound input/output interface that performs D/A conversion and A/D conversion on sound signals. The sound processing section 14 is connected to a sound output device 30, which includes a speaker. The sound processing section 14 outputs sound signals to the sound output device 30 according to a sound output instruction from the control section 11, which is executing a processing according to various control programs.

The graphic processing section 15 is connected to the display device 50 that has the upper image display section 51 and the lower image display section 52. The graphic processing section 15 develops images to the frame memory 19 according to a drawing instruction from the control section 11, and simultaneously outputs video signals to the display device 50 such that the upper and lower image display sections 51 and 52 display images. A switching time for the images to be displayed according to the video signals is set to, for example, 1/30 per frame.

A recording medium 70, in which programs and the like are stored, is installed in the card slot 20. In this embodiment, the recording medium 70 is a semiconductor memory, such as a writable flash memory or the like. The communication interface 17 is connectable to another training device 100 in a wireless or wired manner, and simultaneously connectable to a communication network, such as Internet or the like, in a wireless or wired manner. The training device main body 10 can perform communication with another training device 100 by means of a communication function of the communication interface 17.

The operation input section 21, the card slot 20, and a touch panel 40 are connected to the interface section 18. The interface section 18 causes the RAM 12 to store instruction data from the operation input section 21 based on an operation by a player (user) and instruction data based on an operation on the touch panel 40 with a touch pen 41 and the like by the player. In response to the instruction data stored in the RAM 12, the control section 11 executes various arithmetic processing.

The touch panel 40 may be stacked on display screens of both the upper and lower image display sections 51 and 52, or a display screen of at least one of the upper and lower image display sections 51 and 52. In this case, by managing and controlling a display timing of one of the upper and lower image display sections 51 and 52, on which the touch panel 40 is stacked, and an operation timing with the touch pen 41 and the like on the touch panel 40 and the coordinates of a position where the touch pen 41 and the like touches, the control unit 11 recognizes input information according to operation input by input operation by the player. Moreover, the display device 50 may constitute a display screen from a single image display section, instead of having a plurality of image display sections, such as the upper and lower image display sections 51 and 52.

The interface section 18 performs, according to the instructions from the control section 11, a processing to store data indicative of the progress of a lesson stored in the RAM 12 into the recording medium 70 installed in the card slot 20. The interface section 18 also performs a processing to read out data on the lesson when suspended stored in the recording medium 70 and to transmit such data to the RAM 12.

Various kinds of data, such as the control programs for performing the lesson with the training device 100, are stored in the recording medium 70. Various kinds of data, such as the control programs, stored in the recording medium 70 are read out by the control section 11 via the card slot 20, in which the recording medium 70 is installed, and loaded onto the RAM 12.

The control section 11 executes, according to the control programs loaded onto the RAM 12, various kinds of processing, such as a processing to output a drawing command to the graphic processing section 15, a processing to output a sound output command to the sound processing section 14, and the like. Moreover, while the control section 11 executes the processing, interim data generated according to the progress of the lesson is stored in the RAM 12 used as a work memory.

Figure 4:
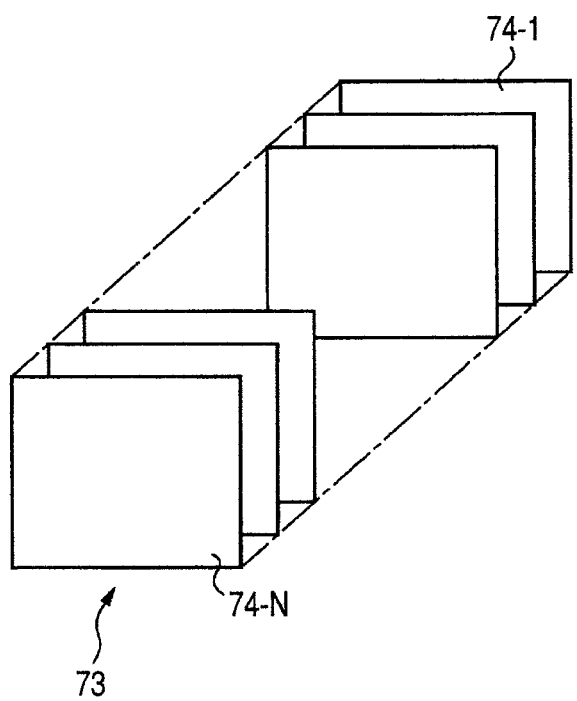
FIG. 4 is a schematic view showing a group of pose data tables.

The recording medium 70 stores a program for executing processing shown in flowcharts described below, a counseling data table 71 shown in FIG. 2, a curriculum data table 72 shown in FIG. 3, and a group of pose data tables 73 shown in FIG. 4.

The counseling data table 71 stores, as shown in FIG. 2, a plurality of different question statements 1-1, 1-2, . . . , in correspondence with questions, for example, 'QUESTION 1', 'QUESTION 2', and the like. The content of each of the question statements is, for example, data that causes a character string for forming a statement about an individual personality or mental state, such as 'ARE YOU CONSCIOUS OF THOSE AROUND AT ANY TIME?', to be displayed on the display device 50.

The curriculum data table 72 stores, as shown in FIG. 3, curriculums in correspondence with lesson courses, for example, 'STRESS RELEASE COURSE', '○○○○ COURSE', and the like. For example, in case of 'STRESS RELEASE COURSE', 'POSE 1' training is given in the lesson 1, 'POSE 3' training is given in the lesson 2, and 'POSE 6' training is given in the lesson 3. As such, different poses are stored in different sequences according to the courses.

Moreover, the number of lessons may be identical for all of the courses or may be different according to the courses.

The group of pose data tables 73 include pose 1 to N data tables 74-1 to 74-N corresponding to N yoga poses. That is, yoga uses a plurality of poses, and among the plurality of yoga poses, the pose 1 to N data tables 74-1 to 74-N corresponding to N (for example, 100) elementary yoga poses 1 to N are included.

Each pose data table 74 stores, as shown in FIG. 5, data about an elementary pose, 'ELEMENTARY POSE', and data about a plurality of simple poses, 'SIMPLE POSE 1', 'SIMPLE POSE 2', . . . . 'ELEMENTARY POSE' means data for an elementary pose corresponding to one of the N yoga poses 1 to N. 'SIMPLE POSE 1', 'SIMPLE POSE 2', . . . are data about simple poses having a lower difficulty level than 'ELEMENTARY POSE', but having identity or commonality with respect to 'ELEMENTARY POSE' in view of the effects or purposes of yoga.

Data, 'ELEMENTARY POSE', 'SIMPLE POSE 1', 'SIMPLE POSE 2', . . . includes 'IMAGE DATA', 'SOUND DATA', 'BREATHING TIMING DATA', and 'DIFFICULTY LEVEL DATA'. In respects to 'IMAGE DATA', an image generated by photographing the pose by the instructor and the motions to that pose is recorded as data displayable on the display device 50. Here, 'IMAGE DATA' is a motion picture, but it may be a still picture or a combination of a motion picture and a still picture. Moreover, the image data may be generated by illustration or computer graphics, instead of the photography.

In respects to 'SOUND DATA', commentary sound, direction sound, or the like to be played together with corresponding 'IMAGE DATA' is recorded as data playable by the sound output device 30. In respects to 'BREATHING TIMING DATA', a breathing timing for corresponding 'IMAGE DATA', specifically, a timing from 'BREATHE IN' to 'BREATHE OUT' is successively recorded as data displayable on the display device 50. 'DIFFICULTY LEVEL DATA' is a numeric value indicating the difficulty level of the corresponding pose. In this embodiment, the higher the difficulty level is, the larger the numeric value is stored.

Moreover, the recording medium 70 is a writable type, as described above, and is provided with a plurality of writable folders.

Next, a processing procedure in this embodiment will be described with reference to flowcharts shown in FIG. 6 and later figures. Moreover, the following processing is executed when the control section 11 controls other constituent elements in the training device based on a lesson program stored in the recording medium 70.

Figure 6:
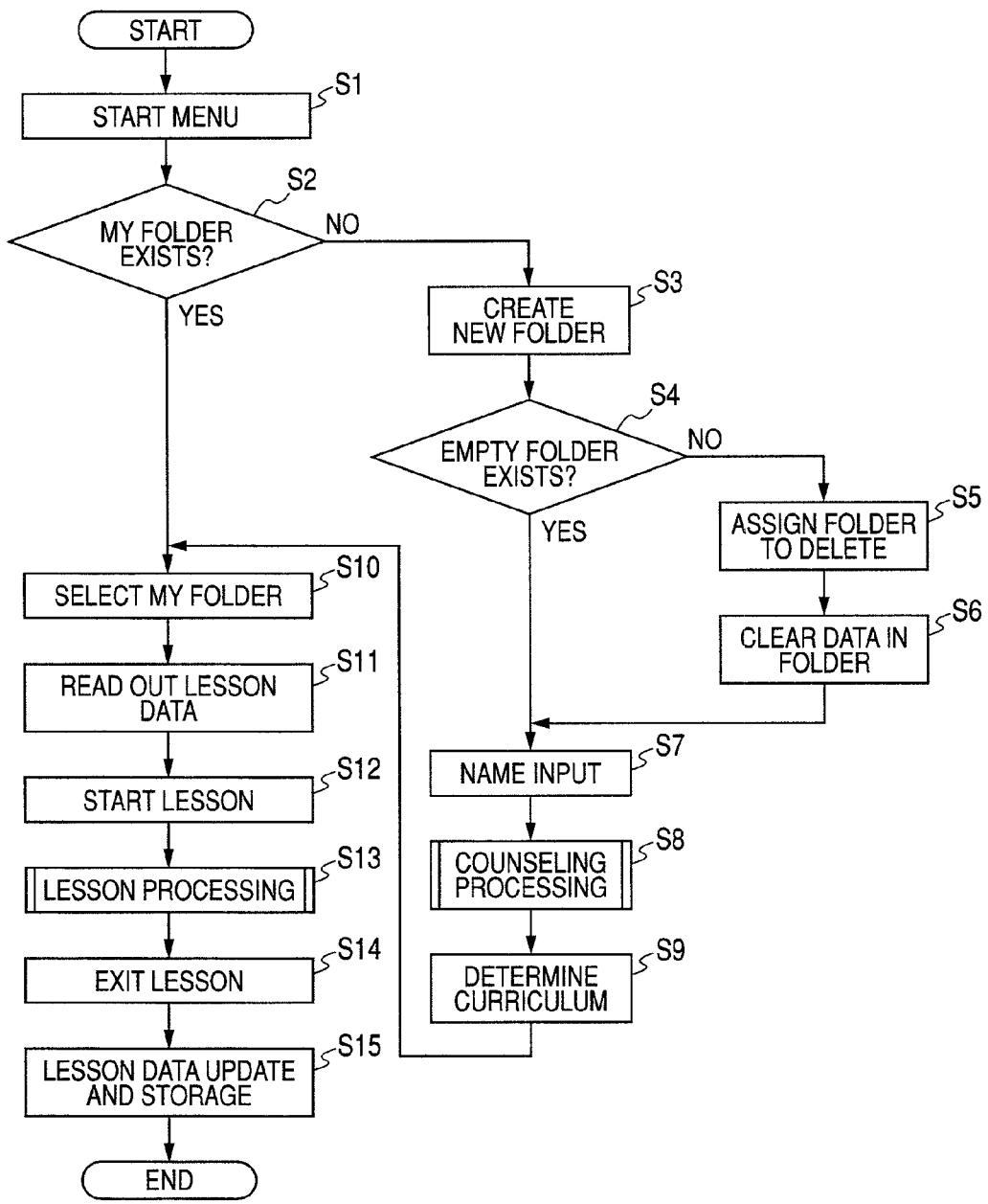
FIG. 6 is a flowchart showing a processing procedure of this embodiment.

As shown in the flowchart of the FIG. 6, first, a start menu is displayed (Step S1). Though not shown, on the start menu, a list of folders named after player names is displayed. Then, a player views the list of folders and checks whether a folder named after his/her name exists or not. As a result, when the folder named after his/her name does not exist, the player touches 'CREATE NEW FOLDER', which is displayed on the start menu along with the list of folders, with the pen. If so, it is determined NO in Step S2, the process progresses from Step S2 to Step S3 to start to create a new folder.

At the time of creating the new folder, first, it is determined whether or not an empty folder exists (Step S4). When the empty folder exists, the process progresses to Step S7, and a name input processing is executed. When no empty folder exists, the player assigns a folder to delete with the pen (Step S5). Then, data in the assigned folder is cleared (Step S6), and the process progresses to Step S7, and the name input processing is executed.

During the name input processing (Step S7), as shown in FIG. 7A, a 'NAME INPUT' button 53 is displayed on the lower image display section 52 of the display device 50, and simultaneously characters 'NAME ENTRY' 54 and a notice 55 are displayed on the upper image display section 51. In this state, if the 'NAME INPUT' button 53 is pen-touched, the display state of FIG. 7A is changed to the display state of FIG. 7B. Then, a keyboard 56 and an 'OK' button 57 are displayed on the lower image display section 52, and simultaneously character display boxes 58 and a notice 59 are displayed on the upper image display section 51.

In the display state (FIG. 7B), if keys on the keyboard 56 are pen-touched, characters corresponding to the pen-touched keys are displayed in the character display boxes 58. In this state, if the 'OK' button 57 is pen-touched, the display state of FIG. 7B is changed to the display state of FIG. 7C. Then, a 'NO, I WANT TO CHANGE' button 60 and a 'YES' button 61 are displayed on the lower image display section 52, and simultaneously a notice 62 including the input name 'Mr./Ms. ○○' is displayed on the upper image display section 51. In the display state (FIG. 7C), the 'NO CANCEL' button 60 is pen-touched, the display state of FIG. 7C returns to the display state of FIG. 7B. Meanwhile, if the 'YES' button 61 is pen-touched, the name is decided.

Then, the decided name is given to the new folder, and the name input processing ends (Step S7).

Subsequently, a counseling processing is executed (Step S8). FIG. 8 is a flowchart showing the procedure of a counseling processing. First, initial screens are displayed on the lower image display section 52 and the upper image display section 51 (Step S101). In respects to the initial screens, as shown in FIG. 9A, a 'COUNSELING START' button 63 is displayed on the lower image display section 52, and a 'COUNSELING' button 64 and a notice 65 are displayed on the upper image display section 51.

Next, it is determined whether the 'COUNSELING START' button 63 is pen-touched or not (Step S102). If the 'COUNSELING START' button 63 is pen-touched, a first selection screen is displayed on the lower image display section 52, and a question statement read out from 'QUESTION 1' of the counseling data table 71 is displayed on the upper image display section 51 (Step S103). Through Step S103, as shown in FIG. 9B, a 'YES' button 94 and a 'NO' button 95 are displayed on the lower image display section 52, and simultaneously a question statement 66 is displayed on the upper image display section 51.

If the player views the question statement 66 and pen-touches one of the 'YES' button 94 and the 'NO' button 95, it is determined YES in Step S104, and the process progresses from Step S104 to Step S105. Then, a second selection screen is displayed on the lower image display section 52, and simultaneously a question statement read out from 'QUESTION 2' of the counseling data table 71 is displayed on the upper image display section 51 (Step S105). Through Step S105, as shown in FIG. 9C, a 'YES' button 94 and a 'NO' button 95 are displayed on the lower image display section 52, and simultaneously a question statement 66 is displayed on the upper image display section 51.

If the player views the question statement 66 and pen-touches one of the 'YES' button 94 and the 'NO' button 95, it is determined YES in Step S106, and the process progresses from Step S106 to Step S107. Then, a course read out from the curriculum data table 72 is displayed on the lower image display section 52, and simultaneously a conclusion statement read out 'CONCLUSION' of the counseling data table 71 is displayed on the upper image display section 51 (Step S107). Through Step S107, as shown in FIG. 9D, a 'NEXT' button 68 and a course name 67 ('STRESS RELEASE COURSE') are displayed on the lower image display section 52, and simultaneously a conclusion statement 69 is displayed on the upper image display section 51.

Therefore, if the counseling processing is executed in Step S8 of FIG. 6, the course name is determined, and thus a curriculum according to the course determined in the following Step S9 is determined. Then, the process progresses from Step S9 to Step S10, the new folder created through Steps S3 to S7 is selected as 'My Folder' (Step S10).

Meanwhile, on the start menu, when a folder named after the name of the corresponding player exists in the list of folders named after player names, the process progresses from Step S2 to Step S10, and the pen-touched folder is selected as the 'My Folder' (Step S10). Next, lesson data stored in that folder is read out (Step S11). The lesson data includes the numbers (lesson 1, lesson 2, and the like) of lessons that are completed previously in the course selected by the player, or the number of a lesson that is suspended previously.

Moreover, when the 'My Folder' is a new folder, lesson data is not stored in the 'My Folder'. Accordingly, Step S11 is not executed, and the process progresses to Step S12.

Figure 10:
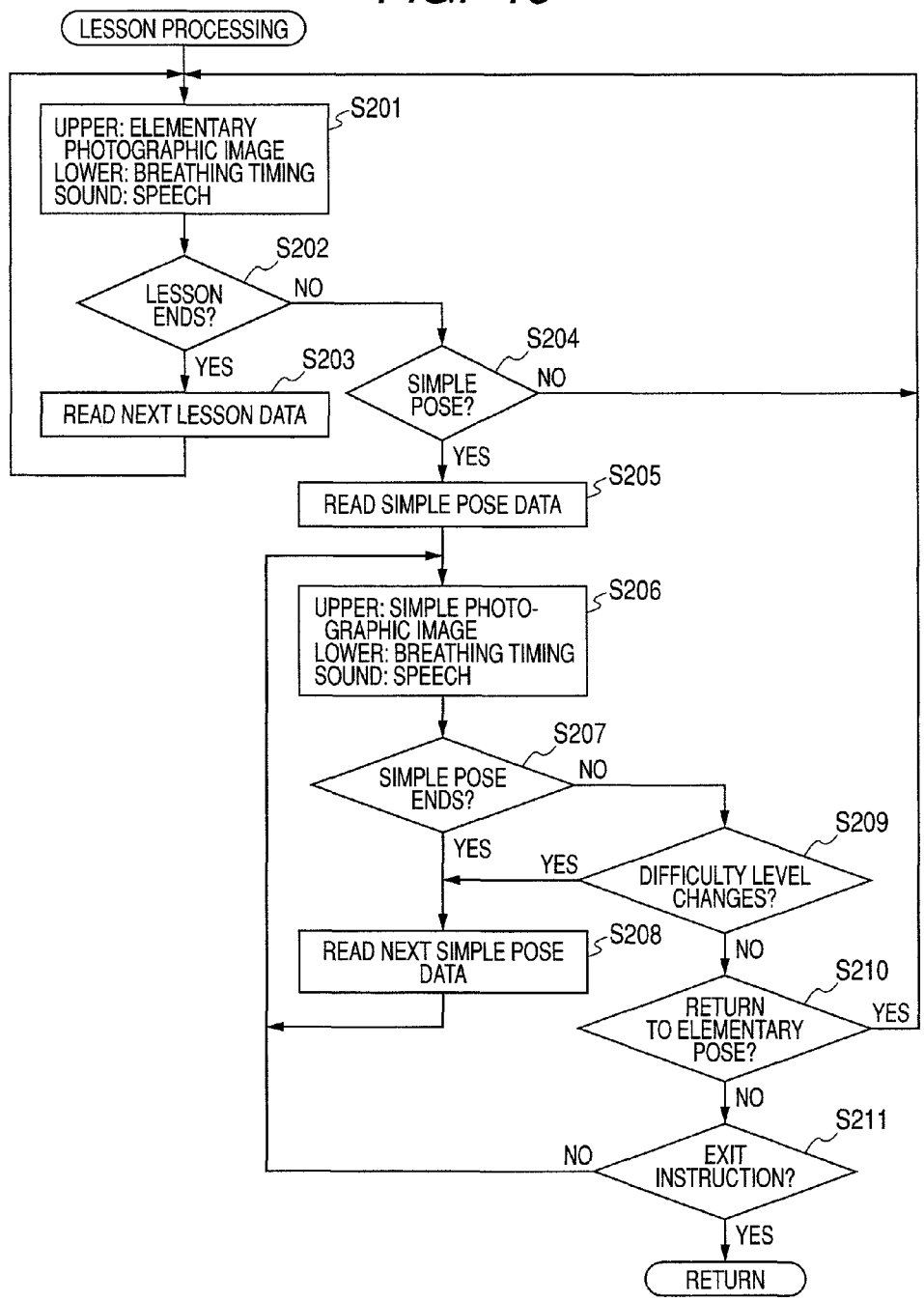
FIG. 10 is a flowchart showing the details of a lesson processing.

Next, a lesson starts (Step S12), and a lesson processing is executed (Step S13). FIG. 10 is a flowchart showing the procedure of a lesson processing (Step S13). First, on the basis of the lesson data, an elementary photographic image is displayed on the upper image display section 51, and a breathing timing is displayed on the lower image display section 52. At the same time, sound is played back by the sound output device 30 (Step S101).

That is, when the lesson data of the corresponding player has already been stored in the 'My Folder', a pose data table 74 corresponding to the previous lesson number of the course stored in the 'My Folder' is read out from the group of pose data tables 73. In addition, when no lesson data is stored in the 'My Folder', a pose data table 74 corresponding to a pose of 'LESSON 1' in the determined course is read out from the group of pose data tables 73.

Figure 11:
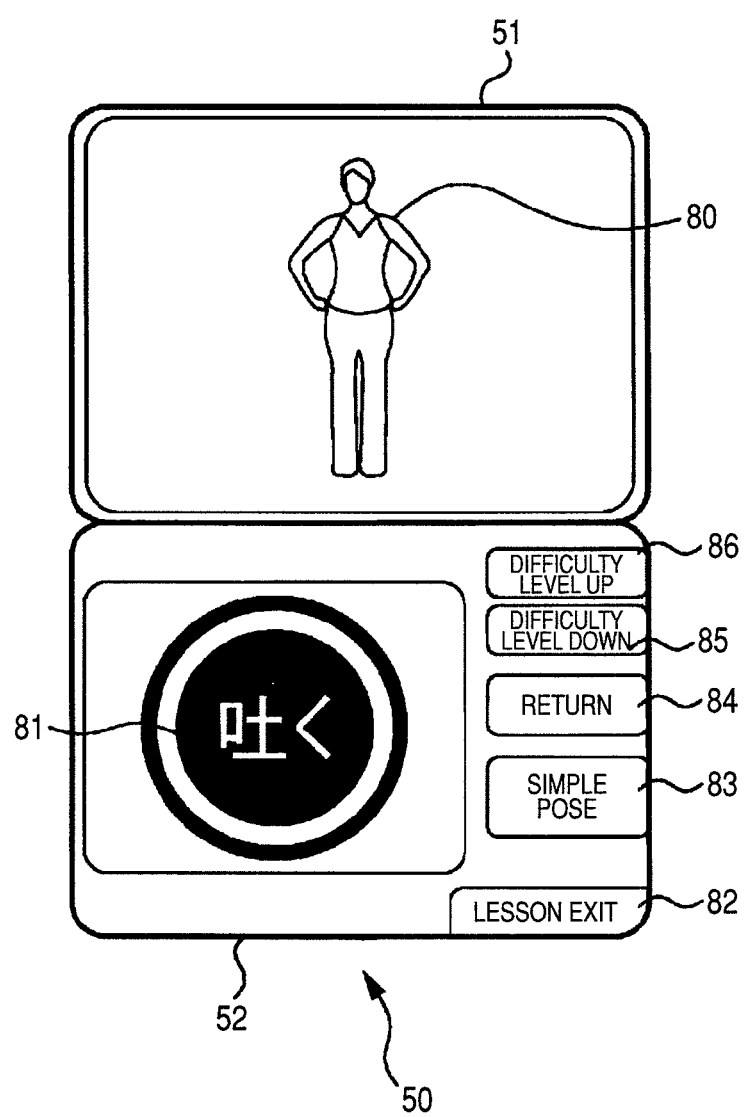
FIG. 11 is a diagram showing an example of a display screen during a lesson processing.

Then, the 'ELEMENTARY PHOTOGRAPHIC IMAGE' data is read out from the read pose data table 74, and is played back and displayed on the upper image display section 51. Accordingly, as shown in FIG. 11, an instructor image (photographic motion picture) 80 that takes a yoga pose corresponding to that lesson is displayed on the upper image display section 51.

At this time, since the training device 100 is a portable type, even if the player takes any pose, he/she can move the training device 100 with him/her at a position according to the pose while continuously watching the screen. Accordingly, the player can take the lesson while watching the upper image display section 51. Therefore, the player can take a lesson smoothly without changing his/her pose during training and confirming the upper image display section 51.

Furthermore, since commentary sound or direction sound is also output from the sound output device 30, the player can take the lesson more smoothly.

In addition, the corresponding 'BREATHING TIMING' data is read out from the read pose data table 74 and is displayed on the lower image display section 52. In respects to this display, as shown in FIG. 11, a breathing pattern image 81 having characters 'BREATHE IN' and a circle surrounding the characters is displayed, and the circle of the breathing pattern image 81 is sequentially decreased in synchronization with a breathe-out operation of the instructor image 80 on the basis of the 'BREATHING TIMING' data until a breathe-in timing reaches. If the breathe-in timing reaches, the characters 'BREATHE-OUT' in the breathing pattern image 81 are changed to 'BREATHE-IN', and the circle of the breathing pattern image 81 is sequentially increased in synchronization with a breathe-in operation of the instructor image 80 on the basis of the 'BREATHING TIMING' data until a breathe-out timing reaches. If the breathe-out timing reaches again, the characters 'BREATHE-IN' in the breathing pattern image 81 are changed to 'BREATHE-OUT', and in the same manner as described above, the circle of the breathing pattern image 81 is sequentially decreased in synchronization with the breathe-out operation of the instructor image 80 on the basis of the 'BREATHING TIMING' data until the breathe-in timing reaches and this proceeding is repeated.

Accordingly, the player can recognize the breathing timing during training by watching the change of the breathing pattern image 81, thereby taking the lesson with correct breathing.

In Step S201, as shown in FIG. 11, a 'LESSON EXIT' button 82, a 'SIMPLE POSE' button 83, a 'RETURN' button 84, a 'DIFFICULTY LEVEL DOWN' button 85, and a 'DIFFICULTY LEVEL UP' button 86 are displayed on the lower image display section 52. The display form of the breathing timing is not limited to the above-described display form. Any display form may be used insofar as the player can visually recognize from the breathe-in timing to the breathe-out timing and from the breathe-out timing to the breathe-in timing.

In Step S202 subsequent to Step S201, it is determined whether or not the lesson ends, that is, whether or not the 'ELEMENTARY PHOTOGRAPHIC IMAGE' data is read out from the pose data table 74 and displayed, and the lesson of the corresponding number ends. If the lesson is not terminated, it is determined whether or not the 'SIMPLE POSE' button 85 is pen-touched (Step S204). When the 'SIMPLE POSE' button 85 is not pen-touched, the process returns to Step S201.

If it is determined in Step S202 that the lesson ends, a pose data table 74 corresponding to a pose of a next lesson in the corresponding course is read out from the group of pose data tables 73 (Step S203). Then, Step S201 and later steps are repeatedly executed.

Accordingly, when the player has a limber body enough to take an elementary pose, he/she takes the yoga lessons without pen-touching the 'SIMPLE POSE' button 85. Therefore, the player can sequentially learn the yoga poses in the course while viewing the instructor images 80 consisting of the yoga pose of the lessons to be sequentially given through the upper image display section 51.

When it is difficult for the player to take the same pose as the instructor image 80 consist of the yoga pose, he/she touches the 'SIMPLE POSE' button 83 with the touch pen 41 or his/her finger. If so, it is determined YES in Step S204, and the process progresses from Step S204 to Step S205. Then, the simple pose data corresponding to the elementary pose during training currently displayed on the upper image display section 51 is read out (Step S205). That is, in Step S11 or Step S203, one of 'SIMPLE POSE 1', 'SIMPLE POSE 2', . . . is read out from the currently read pose data table 74. At this time, in respects to the reading sequence of the simple poses, 'SIMPLE POSE 1' may be read out according to the storage sequence of 'SIMPLE POSE 1', 'SIMPLE POSE 2', . . . . Alternatively, according to the difficulty level, a simple pose having highest difficulty level, a simple pose lowest difficulty level, or a simple pose having intermediate difficulty level may read out.

Next, on the basis of the read simple pose data, a simple photographic image is displayed on the upper image display section 51, and a breathing timing is displayed on the lower image display section 52. Simultaneously, sound is played back by the sound output device 30 (Step S206). That is, in Step S205, if it is assumed that 'SIMPLE POSE 1' data of FIG. 5 is read out, an image based on 'SIMPLE 1 PHOTOGRAPHIC IMAGE' data is displayed on the upper image display section 51, a breathing timing based on 'SIMPLE 1 BREATHING TIMING' data is displayed on the lower image display section 52. Simultaneously, sound based on 'SIMPLE 1 SOUND' data is output from the sound output device 30.

Next, it is determined whether or not the playback of the simple pose data ends, that is, whether or not the 'SIMPLE 1 PHOTOGRAPHIC IMAGE' data is read out from the pose data table 74 and displayed, and the display of the corresponding simple pose ends (Step S207). When the display of the simple pose ends, next simple pose data is read out (Step S208), and Step S206 and later steps are repeatedly performed.

If the display of the simple pose does not end (Step S207; NO), it is determined whether or not an instruction to change the difficulty level is input by pen-touching of the 'DIFFICULTY LEVEL DOWN' button 85 or the 'DIFFICULTY LEVEL UP' button 86 (Step S209).

At this time, when the player thinks it difficult to take the simple pose of the instructor displayed on the upper image display section 51, he/she pen-touches the 'DIFFICULTY LEVEL DOWN' button 85. Meanwhile, when the player thinks it so much easy to take the simple pose of the instructor displayed, he/she pen-touches the 'DIFFICULTY LEVEL UP' button 85. In this case, it is determined YES in Step S209. Accordingly, the process progresses from Step S209 to Step S208. Then, simple pose data having lower difficulty level or higher difficulty level is read out, and Step S206 and later steps are executed.

Therefore, the player can select and learn the simple pose having difficulty level according to his/her own limberness or muscular strength. In addition, as described above, since all of the simple poses are poses having lower difficulty level than the corresponding elementary pose, even a player who is lacking in limberness or muscular strength can take the pose. As a result, the player can continuously take a lesson without getting frustrated during the lesson.

Meanwhile, when it is determined in Step S209 that no instruction to change the difficulty level is input, it is determined whether or not an instruction to return to the elementary pose is input by pen-touching of the 'RETURN' button 84 (Step S210). When the instruction to return to the elementary pose is input, the process returns to Step S201 from Step S210. Accordingly, when the player gains confidence in the elementary pose by training a plurality of simple poses, he/she pen-touches the 'RETURN' button 84 to restart to learn the elementary pose.

If it is determined in Step S210 that the 'RETURN' button 84 is not pen-touched, it is determined whether or not an exit instruction is input by a key operation (Step S211). When no exit instruction is input, the process returns to Step S206. When the exit instruction is input, the process returns to the main flow shown in FIG. 6, and progresses to Step S14.

Referring to the flowchart of FIG. 6, in Step S14, the lesson ends, and in Step S15, a lesson data update and storage processing is executed. During the lesson data update and storage processing, the lesson data is updated by writing, into the 'My Folder', the numbers (lesson 1, lesson 2, and the like) of lessons that are completed recently in the lesson course of the player, or the number of a lesson that is being trained currently.

Accordingly, when the player restarts the yoga lesson later, he/she can take the lesson from a point of time at which he/she ended previously, as described above.

In this embodiment, the difficulty level of the simple pose can be selected, but 'SIMPLE POSE 1', 'SIMPLE POSE 2', . . . may be sequentially displayed, without allowing the player to select the difficulty level. In this case, since the simple poses have lower difficulty level than the elementary pose, even a player who is lacking in limberness can take the pose, and there is no case where the player gets frustrated during the lesson.

In this embodiment, the breathing timing is displayed on the screen, but the breathing timing may be notified by sound, without displaying. In this way, if the breathing timing is notified by sound, the player can recognize the breathing timing, without intently watching the screen.

In this embodiment, the lesson course is indirectly determined by counseling, but it may be directly determined by a selection operation of the player.

In this embodiment, the player inputs his/her intension by touching with the touch pen 41, but a speech recognition function may be installed such that the player may input his/her intension by speech recognition. In this way, if the speech recognition function is installed, the player does not need to hold the touch pen 41 while he/she is taking a pose. In addition, when the player takes a pose using his/her hand or finger, he/she operates the training device 100 without changing his/her pose, thereby continuing to practice.

In this embodiment, a case where the invention is applied to yoga has bee illustrated, but the invention may applied to other exercises or games, such as stretching exercise and the like, which use poses with the body.

The embodiment has been described by way of the training device 100, but the invention may be applied to various portable apparatuses, such as a personal computer, a cellular phone, and the like, insofar as they have an image generation function.

Although the lesson data that causes the training device main body 10 to execute the above-described processing (various kinds of data, such as control programs, used for the lessons) is stored in the recording medium 70, the lesson data may be distributed from a server apparatus, such as a WWW server. In this case, the training device main body 10 may acquire the lesson data to be distributed from the server apparatus through a communication network, store the acquired lesson data in the HDD 13, and load the lesson data from the HDD 13 onto the RAM 12.

What is claimed is:

1. A training system that teaches an exercise using poses with a body, the training system comprising:
   a reproducing device; and
   a recording medium installed on the reproducing device,
   wherein the reproducing device is portable, and includes a display, a notifier, and a computer for controlling the display and the notifier,
   the recording medium is readable by the computer included in the reproducing device, and includes
   an elementary pose data storage that stores elementary pose data used to display a plurality of elementary poses on the display,
   a simple pose data storage that stores simple pose data corresponding to each elementary pose, and is used to display simple poses having a lower difficulty level than each corresponding elementary pose, and
   a breathing pattern image data storage that stores a plurality of breathing pattern image data corresponding to a plurality of timed breathing instructions to be notified by the notifier for each of the elementary poses and the simple poses, and
   the recording medium stores a program executed by the computer:
   causing the display to display an elementary pose based on the elementary pose data, and causing the notifier to notify on the display timed breathing instructions corresponding to the elementary pose based on the breathing pattern image data,
   when the elementary pose is displayed on the display, detecting a predetermined operation,
   when the predetermined operation is detected, reading out, from the simple pose data storage, simple pose data corresponding to a simple pose, which corresponds to the elementary pose being displayed on the display, and reading out, from the breathing pattern image data storage, breathing pattern image data corresponding to the read simple pose data, and
   causing the display to display the simple pose based on the read simple pose data, and in synchronization with the display of the simple pose data, causing the notifier to notify on the display timed breathing instructions corresponding to the simple pose based on the breathing pattern image data, to thereby teach an exercise using poses of the body.

2. The training system according to claim 1,
   wherein the display functions as the notifier, and
   the causing the notifier to notify the timed breathing instructions corresponding to the elementary pose based on the breathing pattern image data causes the display to display the timed breathing instructions corresponding to the elementary pose, and the causing the notifier to notify the timed breathing instructions corresponding to the simple pose causes the display to display the timed breathing instructions corresponding to the simple pose.

3. The training system according to claim 2,
   wherein the reproducing device further includes a replayer that is controlled by the computer to play back sound,
   the recording medium further includes a sound data storage that stores sound data related to the elementary pose displayed based on the elementary pose data stored in the elementary pose data storage, and sound data related to the simple pose displayed based on the simple pose data stored in the simple pose data storage, and
   the causing the notifier to notify the timed breathing instructions corresponding to the elementary pose cause the replayer to play back sound corresponding to the elementary pose, and the causing the notifier to notify the timed breathing instructions corresponding to the simple pose cause the replayer to play back sound corresponding to the simple pose.

4. The training system according to claim 1,
   wherein the reproducing device further includes a replayer that is controlled by the computer to play back sound,
   the recording medium further includes a sound data storage that stores sound data related to the elementary pose displayed based on the elementary pose data stored in the elementary pose data storage, and sound data related to the simple pose displayed based on the simple pose data stored in the simple pose data storage, and
   the causing the notifier to notify the timed breathing instructions corresponding to the elementary pose causes the replayer to play back sound corresponding to the elementary pose, and the causing the notifier to notify the timed breathing instructions corresponding to the simple pose causes the replayer to play back sound corresponding to the simple pose.

5. The training system according to claim 1,
   wherein the elementary pose data and the simple pose data are data generated by photography.

6. The training system according to claim 1,
   wherein the recording medium stores a program which causes the computer to further execute selecting one course of a plurality of courses according to an operation, and
   causing the display to display the elementary pose reads out elementary pose data from the elementary pose data storage according to the selected one course, and causes the display to display the elementary pose.

7. The training system according to claim 6,
   wherein the course is selected according to a multi-stage selection operation.

8. The training system according to claim 1,
   wherein the recording medium further includes a writable storage area, and stores a program which causes the computer to execute writing a training history into the writable storage area, in at least one of the causing the display to display the elementary pose and the causing the display to display the simple pose.

9. The training system according to claim 1, wherein the predetermined operation is detected by speech recognition.

10. The training system according to claim 1, wherein the detection of the predetermined operation causes an adjustment of a difficulty level.

11. The training system according to claim 1, wherein the displayed breathing pattern image corresponds to a pose of the body, in which the pose of the body is displayed on the display.

12. A portable training device that teaches an exercise using poses with the body, the portable training device comprising:
    a display;
    a notifier;
    an elementary pose data storage that stores elementary pose data used to display a plurality of elementary poses on the display;
    a simple pose data storage that stores simple pose data corresponding to each elementary pose, and is used to display simple poses having a lower difficulty level than each corresponding elementary pose;

a breathing pattern image data storage that stores a plurality of breathing pattern image data corresponding to a plurality of timed breathing instructions to be notified by the notifier for each of the elementary poses and the simple poses;

a first training processor that causes the display to display an elementary pose based on the elementary pose data, and causes the notifier to notify on the display timed breathing instructions corresponding to the elementary pose based on the breathing pattern image data;

a detector that when the elementary pose is displayed on the display by the first training processor, detects a predetermined operation;

a readout processor that, when the predetermined operation is detected by the detector, reads out, from the simple pose data storage, simple pose data corresponding to a simple pose, which corresponds to the elementary pose displayed on the display, and reads out, from the breathing pattern image data storage, breathing pattern image data corresponding to the read simple pose data; and a second training processor that causes the display to display the simple pose based on the read simple pose data, and in synchronization with the display of the simple pose data, causes the notifier to notify on the display timed breathing instructions corresponding to the simple pose based on the breathing pattern image data, to thereby teach an exercise using poses of the body.

13. The portable training device according to claim 12, wherein the detector detects the predetermined operation by speech recognition.

14. The portable training device according to claim 12, wherein the detection of the predetermined operation by the detector causes an adjustment of a difficulty level.

15. The portable training device according to claim 12, wherein the displayed breathing pattern image corresponds to a pose of the body, in which the pose of the body is displayed on the display.

16. A non-transitory program recording medium that is readable by a computer included in a portable training device, which includes a display and a notifier, and teaches an exercise using poses with a body, the program recording medium comprising:

an elementary pose data storage that stores elementary pose data which is used to display a plurality of elementary poses on the display;

a simple pose data storage that stores simple pose data corresponding to each elementary pose, and is used to display simple poses having a lower difficulty level than each corresponding elementary pose; and a breathing pattern image data storage that stores a plurality of breathing pattern image data corresponding to a plurality of timed breathing instructions to be notified by the notifier for each of the elementary poses and the simple poses, wherein the program recording medium stores a program executed by the computer:

causing the display to display an elementary pose based on the elementary pose data, and causing the notifier to notify on the display timed breathing instructions corresponding to the elementary pose based on the breathing pattern image data, when the elementary pose is displayed on the display a predetermined operation, when the predetermined operation is detected, reading out, from the simple pose data storage, simple pose data corresponding to a simple pose, which corresponds to the elementary pose being displayed on the display, and reading out, from the breathing pattern image data storage, breathing pattern image data corresponding to the read simple pose data, and causing the display to display the simple pose based on the read simple pose data, and in synchronization with the display of the simple pose data, causing the notifier to notify on the display timed breathing instructions corresponding to the simple pose based on the breathing pattern image data, to thereby teach an exercise using poses of the body.

17. The non-transitory program recording medium according to claim 16, wherein the predetermined operation is detected by speech recognition.

18. The non-transitory program recording medium according to claim 16, wherein the detection of the predetermined operation causes an adjustment of a difficulty level.

19. The non-transitory program recording medium according to claim 16, wherein the displayed breathing pattern image corresponds to a pose of the body, in which the pose of the body is displayed on the display.

\* \* \* \* \*